July 13, 1965 H. VIESSMANN 3,194,270
MIXER VALVE
Filed Sept. 18, 1962 2 Sheets-Sheet 1

United States Patent Office 3,194,270
Patented July 13, 1965

3,194,270
MIXER VALVE
Hans Viessmann, Im Hain, Battenberg (Eder), Germany
Filed Sept. 18, 1962, Ser. No. 224,307
Claims priority, application Germany, Feb. 28, 1962,
V 22,112
3 Claims. (Cl. 137—625.43)

The present invention relates to a change-over and mixing device for two-way mixing with four connections as used between boiler flux and reflux and heating-system flux and reflux, also in so-called single channel mixers with three connections, and relates particularly to the mixer housing.

Mixers of this type are well known and are either cast or welded. The welded mixer has certain advantages in respect of the production cost as compared with the cast type; however, even the welded type involves high cost, especially when its overall dimensions are small, because a mixer is composed of at least three single tube sections, depending on whether two-channel or single-channel mixing is employed. Moreover, the tube sections have to be shaped almost to a rectangular cross-section in the region of their penetration curves so as to obtain perpendicular edges in their relation to the tube-cross axis, permitting tight sealing of the rotary slide valve rotated between such edges. Apart from the four welding seams therefore required (for four single tube sections), additional components have to be welded that will mount the cover flange and the base flange facilitating access to the inside and increasing the rigidity of the tube cross.

It is therefore an object of the present invention to provide a mixer that is combined from the simplest components and welded.

A mixer of this type is essentially characterized by the mixer consisting of two pressed shell-type halves of symmetrical configuration that are united, preferably by welding, in the plane of the cross.

The shell-type half press-molded from sheet metal has the shape, for instance, of a crossed barrel arch (for four tube connections), i.e. for two-channel mixing.

The simple pressing operation replaces the costly measuring and cutting operations on tube sections of conventional mixer versions. It also eliminates the work to fit the tube sections (widening and forming into rectangular cross-section) and adjusting work in the welding operation as the shells come from the press in their final shape and need be only contacted and welded by simple longitudinal seams.

When the slide valve is matched to the tube shape, that is, when it has an approximately ellipsoid configuration, it might directly interwork with the tube walls.

For a simple shape of the slide valve and simple sealing, however, it is more expedient to insert into the tube cross projections by which a cylindrical mixer space is provided in which the slide valve may be adjusted and where the tube connections merge.

For a more detailed description, the mixer according to this invention is shown in the drawings attached.

Figure 1:
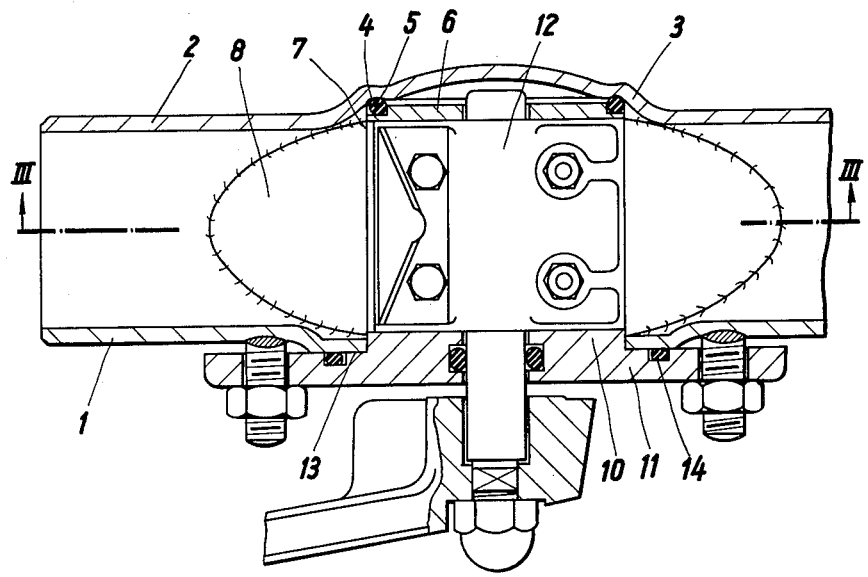
FIG. 1 shows a section through the mixer along the line I—I of FIG. 3.
Figure 2:
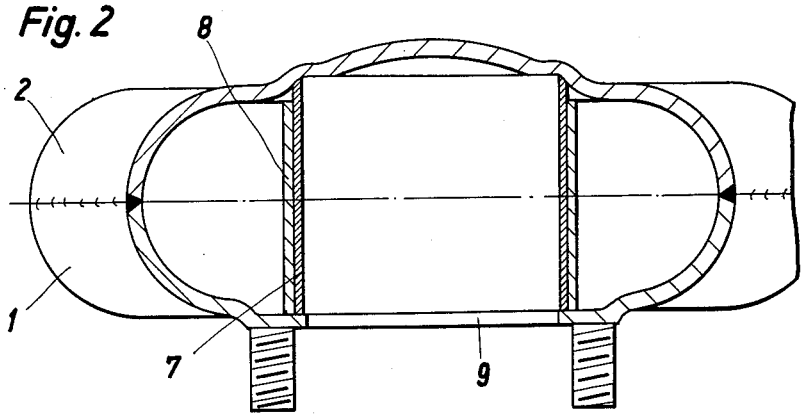
FIG. 2 shows another section through the mixer along the line II—II in FIG. 3 where the rotary slide valve is omitted.
Figure 3:
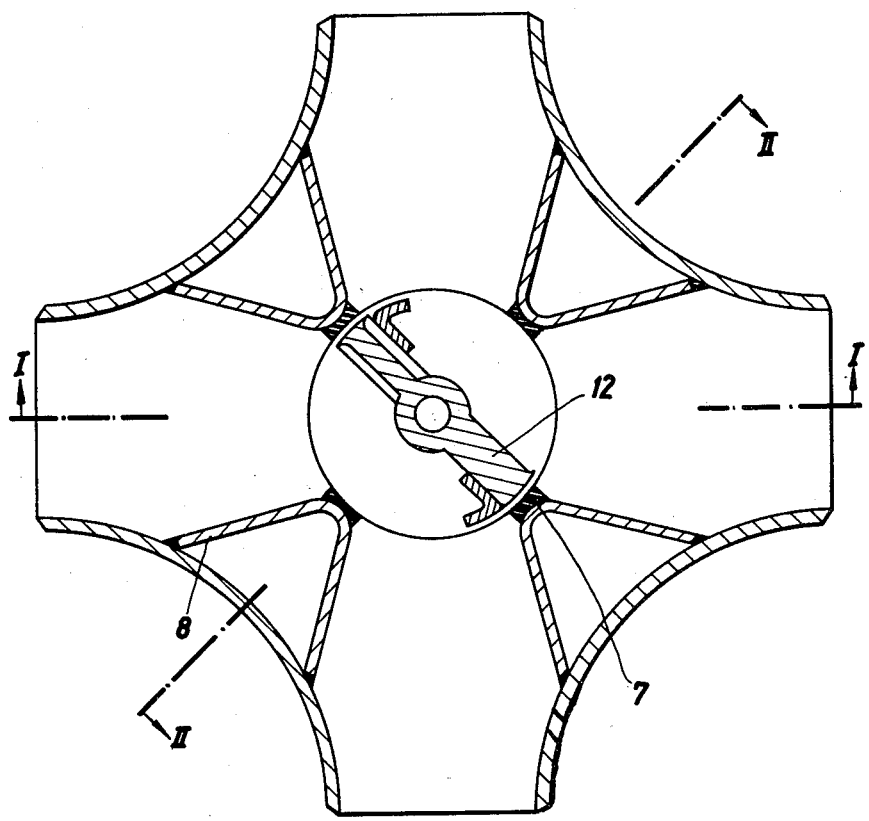
FIG. 3 shows a horizontal section through the mixer along the line III—III in FIG. 1.

The mixer shown comprises two shells 1 and 2 welded to each other. One shell is slightly pressed outward in the vicinity of the centre at point 3 where the anchoring surface 4 is subsequently machined on a lathe to support the O-seal 5. The cover 6 placed thereon is centered by the edges 7 of the projections 8. The shell 1 has in its centre an aperture 9 in which the shoulder 10 of a flange 11 protrudes, in larger mixers another cover (corresponding to cover 6) for sealing purposes and to prevent stalling or sizing of the rotary slide valve 12. To provide a rest and sealing surface 13 for an O-seal 14, the surface 15 of shell 1 is slightly pressed outward in the vicinity of aperture 9 and subsequently machined on a lathe.

For sufficient rigidity of the mixer housing and for simplicity of the shape of valve 12, four angle-shaped projections 8 are welded to the inside of the cross. The mixer housing has to be absolutely rigid because shrinkage stress due to welding operations may introduce considerable strain to the tubing system; this strain has to be taken up by the mixer housing so that its shape does not noticeably change. The projections 8 have an armour of non-corroding material on the vertical edges of bending 7. This armour may be a bar riveted or welded to the projection or material deposited by metal spraying methods.

One of the tube connections and two projections 8 are then eliminated; of the remaining projections 8, one is bent open and placed across that side of the housing where the fourth tube connection has been eliminated.

The mixer is protected against corrosion by sealing the rotary slide valve in its axial clearance. In small mixers, this is done by one cover 6, in larger mixers by two such covers which are pressed by the O-seal against the housing walls under a sort of spring loading provided by these O-seals and, because of the elasticity of these O-seals, are pressed against the rotary slide valve. However, this is not constituting a claim in accordance with the present invention.

What is claimed as new and desired to be secured by Letters Patent is:
1. A mixer valve comprising:
  (a) at least three pipe connections having pipes radiused to bulge inwardly at the line of connection connected thereto;
  (b) a centrally disposed rotary slide valve having an axis within the intersection of said connections;
  (c) two metallic cup-like sections, said sections being welded together along the plane of symmetry extending through the axes of said pipe connections, the radial distance between the innermost walls of the housing and the axis of said rotary slide valve being substantially greater than the diameter of the cylinder circumscribed by the axially parallel edges of said rotary slide valve; and
  (d) guide member plates inserted in said sections which are V-shape and project inward from the radial line of connection between said pipes, the legs of said plates being welded to the inner walls of said sections be- tween said connections, the apex of each of said plates extending parallel to said axis of said rotary slide valve, said plates being disposed to serve as a slide fit with said axially parallel edges of said rotary slide valve, whereby said plate legs and said pipe connections define separate compartments.

2. The mixer, according to claim 1, wherein the apex of said V-shaped plates are provided with a layer of corrosion-resistant material.

3. The mixer as claimed and set forth in claim 1 wherein the cup-like sections are formed with bearing surfaces for said rotary slide, said surfaces having corrosion-resistant plates embedded therein.

References Cited by the Examiner

UNITED STATES PATENTS

| 727,791 | 5/03 | Herrick | 137—311 XR |
| 1,827,266 | 10/31 | Shipley | 137—375 |
| 2,856,952 | 10/58 | Stillwagon | 137—375 XR |
| 2,869,221 | 1/59 | Siepmann | 251—367 XR |

FOREIGN PATENTS 1,024,299   2/58   Germany.

M. CARY NELSON, Primary Examiner.

ISADOR WEIL, Examiner.